(12) United States Patent
Beckman

(10) Patent No.: US 11,135,929 B2
(45) Date of Patent: Oct. 5, 2021

(54) UNIFIED ENERGY AND DATA TRANSFER MEDIUM AND RELATED DEVICES, SYSTEMS AND METHODS

(71) Applicant: Christopher V. Beckman, Los Angeles, CA (US)

(72) Inventor: Christopher V. Beckman, Los Angeles, CA (US)

( * ) Notice: Subject to any disclaimer, the term of this patent is extended or adjusted under 35 U.S.C. 154(b) by 103 days.

(21) Appl. No.: 16/679,249

(22) Filed: Nov. 10, 2019

(65) Prior Publication Data

US 2020/0075266 A1    Mar. 5, 2020

Related U.S. Application Data

(63) Continuation of application No. 15/285,476, filed on Oct. 4, 2016, now abandoned, which is a
(Continued)

(51) Int. Cl.
*H02J 7/00*    (2006.01)
*H02J 7/14*    (2006.01)
(Continued)

(52) U.S. Cl.
CPC ............ *B60L 53/305* (2019.02); *B60L 53/34* (2019.02); *B60L 53/35* (2019.02); *B60L 53/37* (2019.02); *B60L 53/80* (2019.02); *H01G 9/28* (2013.01); *H01M 10/049* (2013.01); *H01M 10/058* (2013.01); *H01M 10/4207* (2013.01); *H01M 10/4214* (2013.01); *H01M 10/4242* (2013.01); *H01M 50/10* (2021.01); *H01M 50/138* (2021.01); *B60L 2240/622* (2013.01); *H01M 10/052* (2013.01); *H01M 10/38* (2013.01); *H01M 50/502* (2021.01); *H01M 50/70* (2021.01); *H01M 2004/021* (2013.01); *H01M 2004/025* (2013.01); *H01M 2010/4271* (2013.01); *H01M 2220/20* (2013.01); *Y02E 60/10* (2013.01); *Y02T 10/70* (2013.01);
(Continued)

(58) Field of Classification Search
USPC ........................................................ 320/134
See application file for complete search history.

(56) References Cited

U.S. PATENT DOCUMENTS 4,956,244 A * 9/1990 Shimizu ............... H01M 8/0693
429/409
5,462,439 A * 10/1995 Keith .................... G07F 15/005
320/109
(Continued)

*Primary Examiner* — Alexis B Pacheco

(57) ABSTRACT

New systems, methods and media for simultaneous energy and data transfer are provided. In some aspects of the invention, an energy and data receiver is provided, which may be used to receive data and energy simultaneously, in a unified manner. Energy and information transfer media, which may be included within such a receiver unit, are also provided.
New electrochemical battery recharging, refurbishment and replacement techniques are also provided. In some aspects of the invention, small, fungible battery elements with external contacts may be delivered to a tank comprising contacts. The cells may be delivered to the tank bridging contacts within the tank, powering an appliance. Density differentials, maneuvering protocols and variable contacts between the elements may aid in placing them in selected circuit orders, and in removing them.

20 Claims, 9 Drawing Sheets

Related U.S. Application Data continuation-in-part of application No. 13/831,770, filed on Mar. 15, 2013, now Pat. No. 9,461,336.

(51) Int. Cl.

| | | |
|---|---|---|
| *B60L 53/30* | (2019.01) | |
| *H01G 9/28* | (2006.01) | |
| *H01M 10/058* | (2010.01) | |
| *H01M 10/42* | (2006.01) | |
| *H01M 10/04* | (2006.01) | |
| *B60L 53/35* | (2019.01) | |
| *B60L 53/80* | (2019.01) | |
| *B60L 53/37* | (2019.01) | |
| *B60L 53/34* | (2019.01) | |
| *H01M 50/10* | (2021.01) | |
| *H01M 50/138* | (2021.01) | |
| *H01M 10/38* | (2006.01) | |
| *H01M 4/02* | (2006.01) | |
| *H01M 10/052* | (2010.01) | |
| *H01M 50/70* | (2021.01) | |
| *H01M 50/502* | (2021.01) | |

(52) U.S. Cl.
CPC ............ *Y02T 10/7072* (2013.01); *Y02T 10/72* (2013.01); *Y02T 90/12* (2013.01); *Y02T 90/14* (2013.01); *Y02T 90/16* (2013.01); *Y10T 29/53022* (2015.01); *Y10T 29/53265* (2015.01)

(56) References Cited

U.S. PATENT DOCUMENTS

| | | | | |
|---|---|---|---|---|
| 8,884,578 | B2* | 11/2014 | Pandy | H01M 8/188 320/101 |
| 2010/0006356 | A1* | 1/2010 | Curry | G06Q 20/10 180/65.8 |
| 2012/0010894 | A1* | 1/2012 | Jammer | G07F 15/005 705/1.1 |
| 2012/0019203 | A1* | 1/2012 | Kressner | H02J 7/342 320/109 |
| 2012/0306442 | A1* | 12/2012 | Raghavan | H02J 7/00 320/109 |
| 2013/0049692 | A1* | 2/2013 | Kuhs | H01G 11/14 320/127 |

* cited by examiner

UNIFIED ENERGY AND DATA TRANSFER MEDIUM AND RELATED DEVICES, SYSTEMS AND METHODS

CROSS-REFERENCE TO RELATED APPLICATIONS

The present application is a continuation of co-pending U.S. patent application Ser. No. 15/285,476, filed Oct. 4, 2016, titled "Battery, Energy and Simultaneous Data Transfer Systems," which is a continuation-in-part of U.S. patent application Ser. No. 13/831,770, filed Mar. 15, 2013, titled "Rapid Battery Replacement and Recharging Techniques," now U.S. Pat. No. 9,461,336, the entire contents of each of which are incorporated by reference into the present application.

INTELLECTUAL PROPERTY NOTICE

Copyright and Trademark Notice: © Copyright 2013-2019 Christopher V. Beckman. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Unless otherwise stated, all trademarks disclosed in this patent document and other distinctive names, emblems, and designs associated with product or service descriptions, are subject to trademark rights. Specific notices also accompany the drawings incorporated in this application; the material subject to this notice, however, is not limited to those drawings.

FIELD OF THE INVENTION

The present invention relates to the field of electrochemical batteries and, more specifically, rechargeable batteries and energy transfer media. The present invention also relates to data transfer systems.

BACKGROUND

Electrochemical batteries ("batteries"), which provide a stable, continuous electrical current to a circuit from a chemical energy source, have been in use at least since the early 1800s, when Alessandro Volta invented the voltaic pile. In a battery, internal chemical reactions (such as an oxidation/reduction reaction) drive electrons (and, therefore, a negative net charge) to an electrical contact called an anode, and a positive charge to another electrical contact called a cathode. By bridging the anode and cathode with an electrical conductor, a circuit is formed, which may include an appliance, and electrical current flows from cathode to the anode, powering such an appliance. As the battery discharges its current, the internal chemical reaction, and the battery itself, is eventually depleted and must be replaced or recharged to maintain delivery of electrical power in the circuit.

The first rechargeable batteries were lead-acid batteries, originating in the 1850s. By passing an electrical current in the direction opposing its discharge current, some of the chemical reactions are reversed (and the capacity of the battery is restored) in a rechargeable battery. To this day, rechargeable batteries face difficult challenges and are thought by many to be a relatively impractical power source for high-power, high-capacity applications. Among other challenges, each rechargeable battery has its own unique discharge and optimal recharging profile ("curve"), requiring specialized hardware to carefully control, and requiring significant time to accomplish. If sub-optimal discharge takes place, a significant amount of power is lost in waste heat. That waste heat, if mismanaged, can lead to catastrophic events, such as fires that destroy the appliance and injure users. See, e.g., Consumer Product Safety Commission, *PC Notebook Computer Batteries Recalled Due to Fire and Burn Hazard*, Recalls Release No. 09-035 (Oct. 30, 2008), available at http://www.cpsc.gov/en/Recalls/2009/PC-Notebook-Computer-Batteries-Recalled-Due-to-Fire-and-Burn-Hazard/. Incorrectly applied recharge currents, even in batteries designed to be recharged, may result in catastrophic events—such as explosion due to electrolysis releasing gas. Virtually all mainstream battery labels in everyday households instruct laymen on how to avoid the risks of explosion and leakage from common misuse, such as placing the battery into an appliance backwards. See, e.g., Proctor & Gamble, Duracell Duralock 1.5 Volt AA Alkaline Battery Product Label (EXP 2022).

Due to environmental concerns related to the use of fossil fuels, electric and hybrid vehicles have been developed, using large numbers of rechargeable batteries. Among the unique challenges in this area are carefully pairing batteries in series arrays with similar electrochemical profiles in terms of capacity and resistance, and preventing individual cells from becoming charged and discharged out-of-sync with one another. At some expense, charge management structures attempt to overcome such challenges.

Artificial methods of data storage have existed for millennia, dating at least from the time of cave paintings and tallying by marking sticks approximately 40,000 years ago. Systematic data storage using standardized symbols—for example, writing on clay tablets—dates at least from Ancient Sumer in the third millennium B.C.E. More recently, data storage using computers has arisen, now predominantly in a digital format involving the serial storage and retrieval of bits of data.

It should be understood that the disclosures in this application related to the background of the invention in, but not limited to, this section titled "Background," are to aid readers in comprehending the invention, and do not exclusively set forth prior art or other publicly known aspects affecting the application; these disclosures comprise details of the inventor's own discoveries, work and work results, including aspects of the present invention. These disclosures comprise statements that should not be construed as admissions related to prior art or the work of others prior to the conception or reduction to practice of the present invention.

SUMMARY OF THE INVENTION

New systems, methods and media for simultaneous energy and data transfer are provided. In some aspects of the invention, an energy and data receiver is provided, which may be used to receive data and energy simultaneously, in a unified manner. Energy and information transfer media, which may be included within such a receiver unit, are also provided.

New electrochemical battery recharging, refurbishment and replacement techniques are also provided. In some aspects of the invention, small, fungible battery elements may be immersed in a fluid or gel and delivered via a bifurcated pump interface that simultaneously unloads discharged cells and loads new, charged cells, to accomplish rapid cell replacement and recharging. The cells may be magnetically aligned or otherwise maneuvered to bring cathode and anode elements together, in series, and bridge contacts between themselves and within the tank (for power service to an appliance). Control system(s) may aid in such alignment, maneuvering and variable contact formation, and other aspects of the invention, set forth below.

Density, other differentials and actuated magnetic guidance may be used between the battery elements, to sort and arrange them in ideal physical orders and contact sequences. For example, charged and discharged battery elements, battery elements with particular capacities, or battery elements with a physical flaw, may be sorted and arranged into optimal series or parallel circuits (with similar charge states and capacities) and separated from one another for isolation and removal. For example, in some aspects, cells attain a final electrostatic charge differential that may drive compression of the cell, to increase its density upon discharge, or vice versa. In others, a discharged battery may attain an electrochemical state that leads it to bind with denser or lighter materials or materials that are more easily filtered or moved (carriers). Such carrier and filtration methods exploit an existing difference between charged and discharged cells, such as salt content in the electrolyte affecting its diamagnetism and motility in a variable magnetic field.

In other aspects, cathode and/or anode elements may be rapidly flushed to accomplish rapid recharging, in a staged process. In some embodiments, a buffer solution may be sorted into chambers to apply a more uniform immersion of the solution about an electrode. This may be done by selective weighting of the solution in different chemical states.

Aspects of the invention also provide for rapid exchange of larger, streamlined battery elements, without the use of an immersive fluid, and the systematic control of recharging balances accomplished by such exchanges.

Where any term is set forth in a sentence, clause or statement ("statement"), each possible meaning, significance and/or sense of any term used in this application should be read as if separately, conjunctively and/or alternatively set forth in additional statements, as necessary to exhaust the possible meanings of each such term and each such statement.

It should also be understood that, for convenience and readability, this application may set forth particular pronouns and other linguistic qualifiers of various specific gender and number, but, where this occurs, all other logically possible gender and number alternatives should also be read in as both conjunctive and alternative statements, as if equally, separately set forth therein.

DETAILED DESCRIPTION OF THE INVENTION

Figure 1:
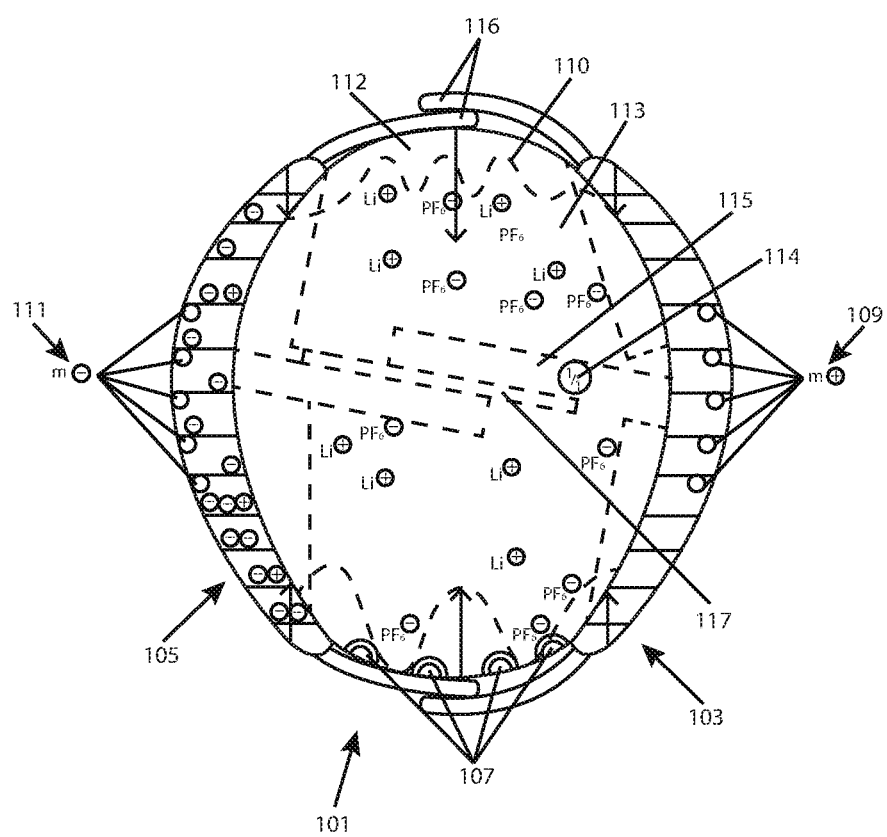
FIG. 1 is a side view of an exemplary battery cell that may be used along with several other such cells, in a charging gel or fluid, in accordance with aspects of the invention.

FIG. 1 is a side view of an exemplary battery cell 101 that may be used along with several other such cells, in a charging gel or fluid, in accordance with aspects of the invention. Cell 101 is a complete battery, capacitor or other device able to deliver a current for use in an appliance. The precise form of Cell 101 is illustrative only, and many other alternate forms may be used to carry out aspects of the invention.

Among its capabilities, cell 101 may deliver an electrical current from a cathode 103, and through a circuit, and receiving current to an anode 105 (each an electrode). Electrodes 103 and 105 each have a multi-valent, curved outer contact area, which contribute to the overall curved and generally spherical shape of cell 101. However, cell 101 may alter its density, for example, by expanding and/or contracting depending upon its charge condition, as will be discussed in greater detail, below. Electrodes 103 and 105 may make contact with neighboring electrodes (not pictured) with contact areas of a variety shapes and sizes, including, but not limited to, neighboring contacts of other cells similar to cell 101. However, owing the shapes and locations of electrodes 103 and 105 (and similar, neighboring electrodes) for such contact to occur, generally, a neighboring electrode to the right or left of cell 101 will need to be oriented in a substantially similar way as cell 101. A wide variety of alignment techniques may be used, including neighboring physical force, gravitational bias (for example, due to bottom weights 107) or, in a preferred embodiment, magnetic alignment. To explicate that embodiment, cell 101 may comprise a magnetic dipole (or dipoles) such as that shown as positive magnetic pole(s) 109, at or about the center of the cathode, and negative magnetic pole(s) 111, at or about the center of the anode. The magnetic poles 109 and 111 generally lead each such similar cell, with the same components as cell 101, to mutually align and touch one another's contacts, in series.

To alter its density, a cell such as cell 101 may, for example, contract its electrodes inward, toward one another. An at least partially flexible or otherwise collapsible inner container wall 110 holding electrolyte 113 of cell 101 may aid in effectuating that change in density, for example, with the aid of a compressible/expandable interstitial space 112, confined by overlapping sliding louvres 116, which may contain a compressible gas. But a wide variety of alternate means for altering the density of the cell, including, but not limited to, alterations to the electrolytic or other chemical or physical contents, may also be effectuated. In some embodiments, cell 101 depletes its charge, by discharging to provide power to a circuit, it decreases in size and/or increases its density—although the reverse, and other filtration enabling differentials linked to charge condition may, alternative or in addition, be used. For example, near the end of discharge, for example, by a current-triggered switch 114 on part of cathode 103, may disconnect part of cathode 103, such as mid-cathode section 115, from the remainder of the cathode. At that point, a charge carrying ion, such as the positively-charged Lithium ion pictured, may continue to build without neutralization by incoming electrons from the circuit current. In conjunction with a similarly isolated negatively-charged section of anode 105, that discharge-dependent negative charge may cause a mutual, inward pulling attraction between the two anodes, which may travel in towards one another on an insulated bridge 117 (e.g., on which at least one of the electrode's middle sections may run, laterally on a rail). Recharging cell 101 may reset switch 114 by the same switch, which may be reversed by reversed current. As will be discussed with reference to further figures, below, the alteration of cell 101's density may lead it, and other cells with the same structure, to automatically sort themselves by grouping together when in a similar charge condition, for example, in a tank or other container holding such cells. The rounded, spherical or otherwise stream-lined shape of a group of cells such as 101 may facilitate the movement and sorting of cells past one another, for sorting and maneuvering purposes, as will be explained further, below.

In some embodiments, cell 101 may expand, rather than contract, and decrease in density, rather than increase in density, upon discharge. In such embodiments, a neighboring net positive charge, for example, on bridge 117 may drive cathode section 115 farther away, rather than closer, upon section 115 accumulating a net positive charge (for example, from intercalated Lithium ions). This may be preferred in embodiments where the magnetic dipole is on a central element, such as bridge 117, that becomes too shielded and distant between cells and other neighboring magnetic materials to become effective. This may have a freeing effect, permitting cells such as 201 to move more freely, and separate out, upon discharge, as will be discussed in greater detail below.

Figure 2:
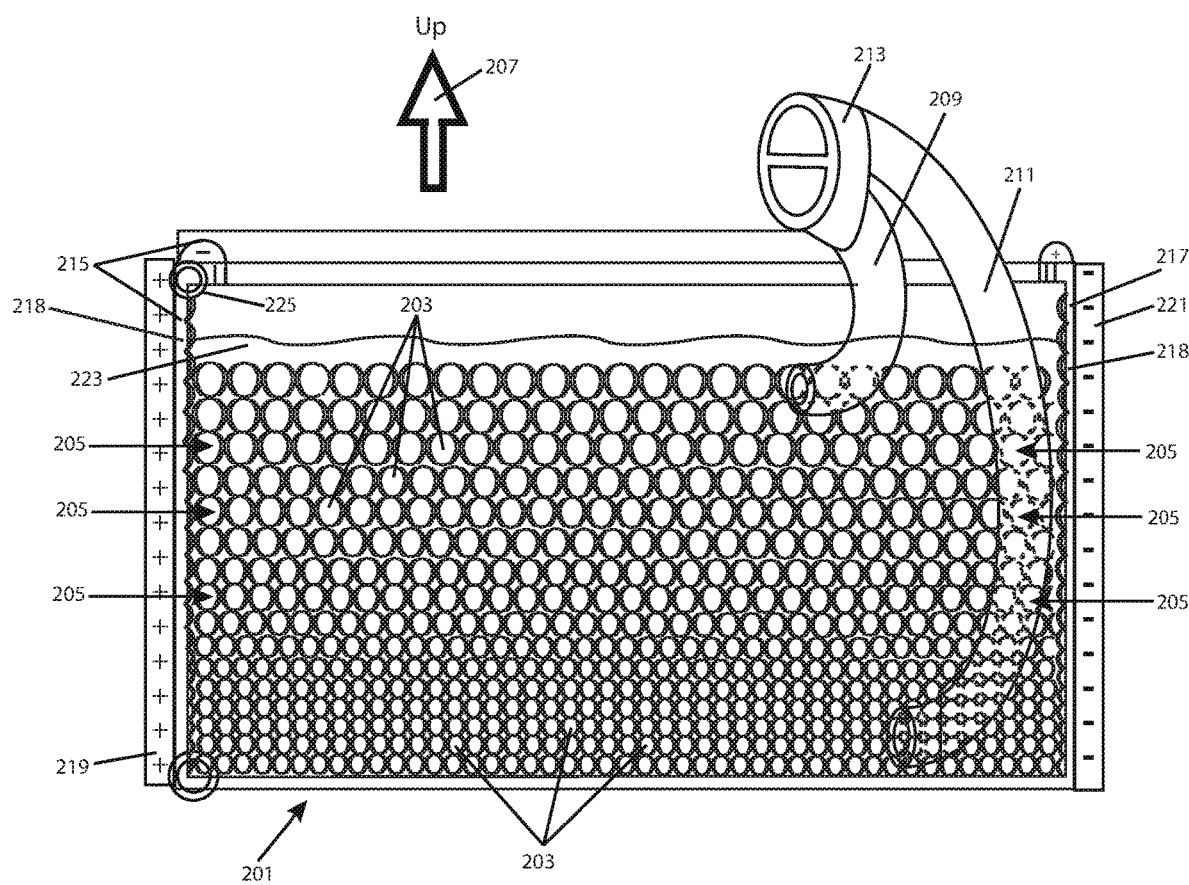
FIG. 2 is a side, cross-sectional view of a battery cell fluid tank, including several battery cells such as the example provided in FIG. 1, above, in accordance with aspects of the present invention.

FIG. 2 is a side, cross-sectional view of an exemplary battery cell fluid tank 201, including several battery cells such as the example provided in FIG. 1, above, in accordance with aspects of the present invention. A plurality of variable-density battery cells, such as the examples shown as 203, which may each be similar to or as discussed in reference to FIG. 1, above, are present in the tank, and aligned in rows by their magnetic dipoles, as also discussed in reference to FIG. 1. In addition, cells 203 are stratified in layers or rows, such as those examples shown as 205, according to their relative density (weight per volume) and are so stratified, in part, due to the influence of gravity (producing a force opposite to that shown as the "Up" arrow 207, or, vertically downward from the perspective of the figure). To ease viewing, only one vertical plane layer of cells 203 are shown, but it should be understood that tank 201 is a three-dimensional volume, and cells 203 would extend in three dimensions, not just two, and include several layers into the page, as well as up and down and left and right, in practice. Because, as discussed above, the density of cells such as 203 may increase with discharge and, in some embodiments, the degree of discharge may lead to a graduated density change, cells 203 occur in several such rows, in which the individual cells are approximately of equal size and charge condition. As mentioned above, in some embodiments, the cells 203 may become less dense with discharge and, if such embodiments are implemented in this figure, the most fully discharged cells will be in the top-most layer(s). As also mentioned above, in some embodiments, those discharged cells may also be more free from magnetic alignment with each other, and easier to pull apart from each other. As such, discharged cells at the top of the tank will be easier to remove, for example, by an upper siphon tube 209, which may be connected to a pump (not pictured) and lower filling tube 211 (for example, with a variably-sealing nozzle that may variably connect and form a seal with bifurcated nozzle inlet/outlet 213). Such a pump may simultaneously load newly-charged, dense and small cells 205 at the bottom of tank 201 via tube 211 and remove discharged cells at the top of the tank via tube 209. The discharged cells may then be recharged in an off-board facility, according to the optimal recharging regimen for the cells, and the tank exchange for fresh, charged cells is performed more quickly than on-board recharging. An exemplary pump handle and bifurcated nozzle system are shown in greater detail, below, in reference to FIG. 3.

To discharge their energy into a circuit delivering power to an appliance, bridging the lead and tail (outer-facing) anodes and cathodes of each cell row, terminal contacts at a super-anode 215 and a super-cathode 217, at opposite ends of the tank, are provided, with contacts 218 that variably electrically connect with those lead anodes and cathodes in each row 205 of cells 203. To maintain proper alignment, actuable magnets, such as those shown as positive inward-facing pole 219 and negative inward-facing pole 221, may aid in maintaining the alignment of the cells 203 and rows 205, maintaining series of cells for the circuit. To facilitate the resorting, poles 219 and 221 may be alterable, and/or new magnetic fields (for example, caused by actuable/creatable upward-facing magnets near the bottom of the tank 201) may be formed by additional magnets to momentarily free up, or even drive downward, the movement of cells 203 until they are properly re-sorted by charge. To maintain power to external circuits during these resorting maneuvers, and to power these maneuvers, capacitors or an auxiliary battery may be used. Also, to aid the free-movement and resorting of cells 203, an interstitial suction-enabling, lubricant fluid 223 may surround the cells, and aid in their siphoning via tubes 209 and 211. Preferably, such a fluid is not highly conductive, with few dissolved electrolytes, preventing short-circuiting, but does not form an unbridgeable insulating layer between anodes and cathodes of cells that abut one another. Deionized water, among other liquids, gels and/or fluids, may be used. Any suitable fluid known in the art, including but not limited to, gasses, gels, liquids and/or suspensions, may be used.

A margin of air or empty space is shown at the top of tank 201, such that, with the expansion of discharged cells, there will be sufficient room for the cells, and enabling cell movement. A sensor and automatic shut-off mechanism in a pump servicing the tank may aid in accomplishing optimum fill levels for that purpose.

Figure 3:
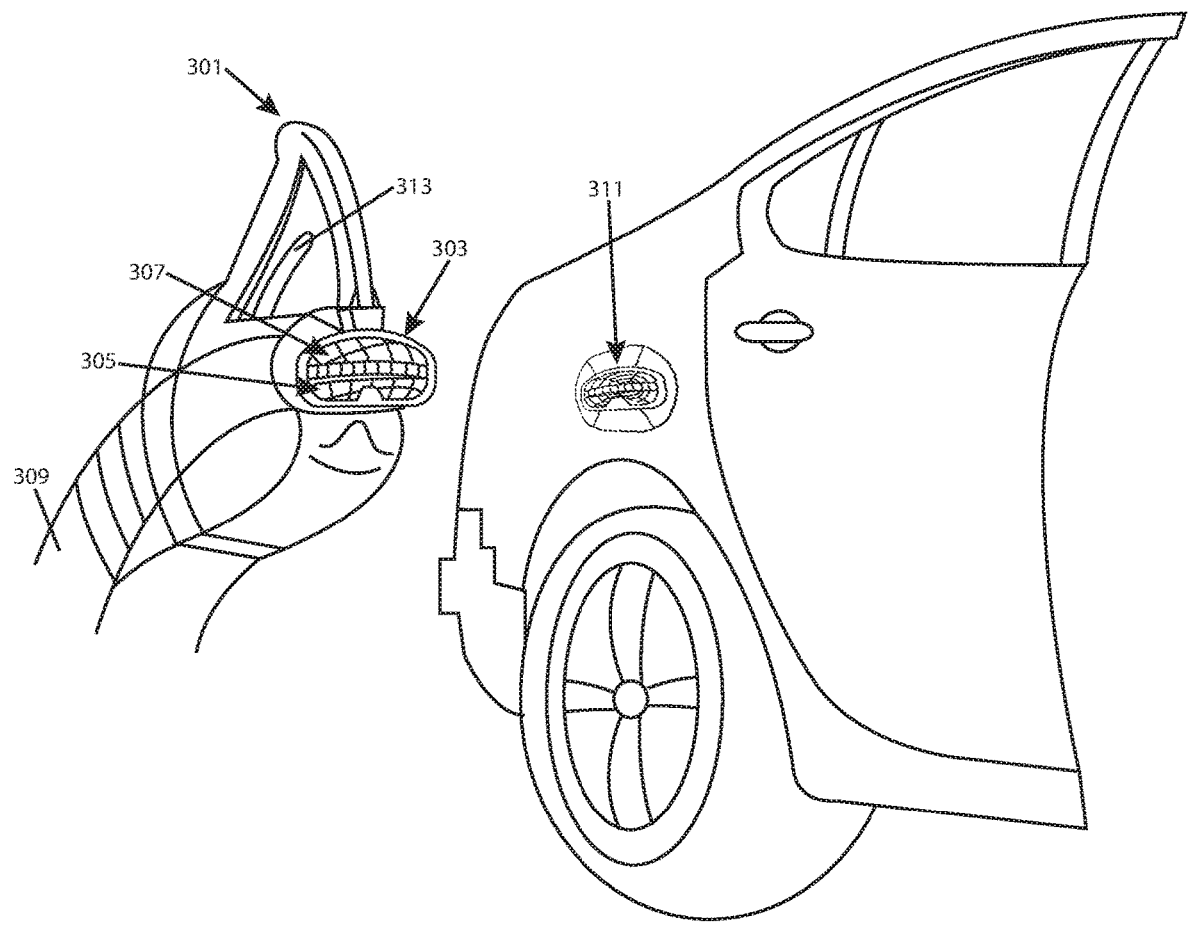
FIG. 3 is a perspective illustration of aspects of an exemplary system, including an actuable pump handle and bifurcated nozzle for the simultaneous delivery of freshly-charged battery cells and fluid in which they are immersed and removal of discharged battery cells and fluid in which they are immersed, in accordance with aspects of the present invention.

FIG. 3 is a perspective illustration of aspects of an exemplary system, including an actuable pump handle 301 and bifurcated nozzle 303 for the simultaneous delivery of freshly-charged battery cells and fluid in which they are immersed and removal of discharged battery cells and fluid in which they are immersed. Nozzle 303 is bifurcated into a removal inlet 305 and a delivery outlet 307. Inlet 305 and outlet 307 are exits of an inlet tube and an outflow tube, respectively, comprised in pump service hose 309. As mentioned above, a pump (not pictured) may drive the flow of both newly charged cells from outlet 307 and discharged cells into inlet 305, and the suction-enabling, lubricating insulating fluid in which they are immersed. The pump may drive flow from either or both tubes, as pressure from outlet 307 or suction from inlet 305 will drive the other with an fluid-tight seal between nozzle 303 and a tank that it is operating on—for example, a tanks such as that discussed above, with reference to FIG. 2, with its corresponding nozzle inlet/outlet 213.

Such a tank nozzle inlet/outlet is shown as 311, in connection with a battery tank installed on an electrically-powered motor vehicle. Tank inlet/outlet 311, as with inlet/outlet 213, is bifurcated to complement the corresponding inlet 305 and outlet 307 of nozzle 303, with which it may variably mate, and form a fluid-tight seal. To perform a discharged cell replacement (with fresh cells) a user may press nozzle 303 into tank inlet/outlet 311 and, if a control system connected to sensors detecting proper sealing between the two (for example, in the pump handle 301 or inlet and outlet tubes), the pump may begin to operate, in some embodiments, after a user has actuated a GUI, which may include pump actuation handle 313. Preferably, a hermetic valve seals both the inlet 305 and outlet 307, and complementary inlet/outlet 303, to prevent spillage and the introduction of air into the system.

Figure 4:
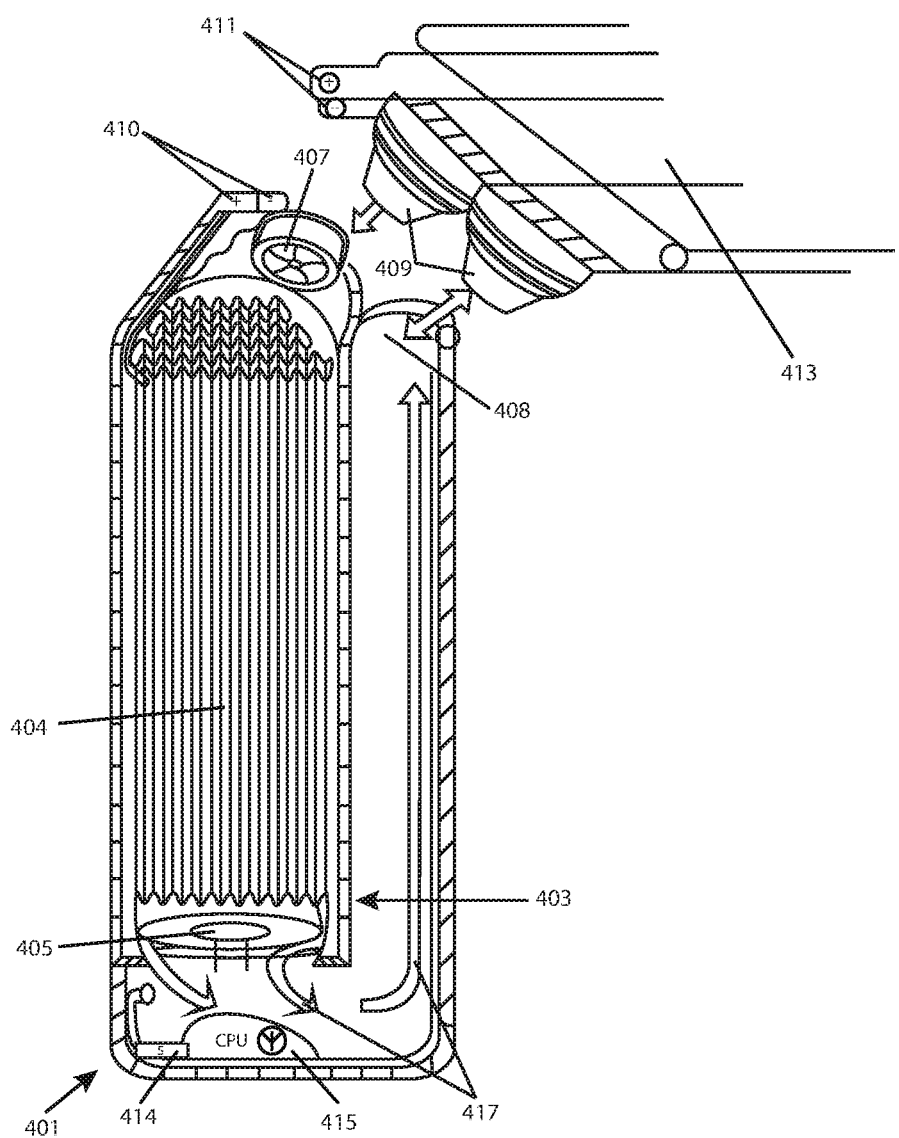
FIG. 4 depicts a battery cell with a system enabling specialized electrolyte flushing, which, in effect, allows for rapid recharging in accordance with additional aspects of the invention.

FIG. 4 depicts a battery cell 401 with a system enabling specialized electrolyte flushing, which, in effect, allows for rapid recharging in accordance with additional aspects of the invention. Cell 401 comprises an inner cell section 403, containing some conventional components of a lithium ion battery: folded and/or wound layers of electrodes 404 (anode and cathode layers, with separators) immersed in an electrolyte, such as an organic solvent and Li+ and $PF_{6-}$ salt ions dissolved within it. However, unlike conventional cells, section 403 is not fully "starved" with absolutely minimal electrolyte, and a variable valve 405, along with a variable inlet valve 407 and outlet valve 408 and corresponding flushing nozzles 409 from an external recharging system (not fully pictured), may permit the periodic flushing of specialized electrolyte fluids between the anode and cathode layers, to hasten recharging, clean impurities, and prolong the life of the cell. In addition, reverse-current recharging electrodes 411, associated with nozzles 409 in a recharging armature 413, assist in effectuating recharging, along with the flushing techniques, as discussed below.

An exemplary recharging process for cell 401 may include the following steps. First, cell 401 is discharged, for example, by powering an appliance until all free lithium ions in the electrolyte have intercalated with material in the cathode (for example, a crystal structure incorporating Li+ ions, driving electron flow into the cathode). Second, recharging armature 411 may extend from a recharging system, engage with valves 407 and 408, and proceed to drive electrolyte with a high concentration of $PF_{6-}$ ions, and no Li+ ions, from the upper outlet nozzle, into valve 407, and through the pleated electrode material 404. At the same time, armature 413, through contacts 411, begins to drive electrons out of the cathode material with a reverse (charging) current. This charging current may be much higher, and recharging accomplished much faster, than in a comparable non-flushing battery cell. After substantially all of the Li+ ions are stripped from the cathode, and flushed, the recharging system may begin to flush the electrodes with a new electrolyte solution, this time, with a high concentration of Li+ ions, while applying a strong recharging current to drive electrons into the anode and, for example, Li+ ions into the anode, again intercalating them, in this instance, into an anode material, such as graphite. Finally, a balanced electrolyte may be introduced in final steps, with matching, conventional levels of both Li+ and $PF_{6-}$, to again provide a buffer for discharge reactions. To assist in the determination when the relevant ions are flushed and saturated for each stage, a sensor 414 placed at the exit of the inner cell 403 (for example, below valve 405) may be provided, along with a local processor 415, which may be in connection with a control subsystem within the recharging system—such as, but not limited to, the control system discussed with reference to FIG. 9, below. Sensor 414 is preferably placed directly in the exit path 417 of the flushed fluid exiting valve 405, and being pulled into the bottom nozzle 409, to provide information, for example, concerning when all Li+ ions have been stripped from the cathode (and the sensor detects no such ions), in that step, and to provide information concerning when Li+ ions have saturated the anode (and detects too high a concentration of that ion), in that step.

The type of battery (lithium ion) used in this example is exemplary only, and such a staged ion flushing and saturation technique may be used with virtually any other battery type, and even some capacitors.

Figure 5:
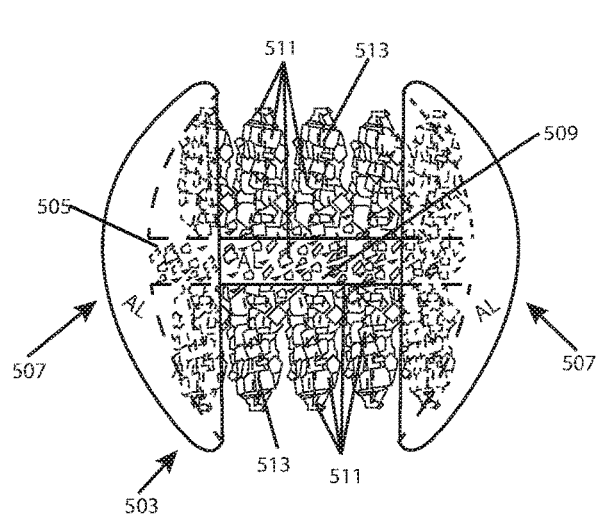
FIG. 5 depicts a stream-lined cathode element, which may be variably combined, flushed and replaced with other such cathode elements to accomplish rapid recharging of a battery cell in accordance with aspects of the present invention.

FIG. 5 depicts a stream-lined cathode element 503, which may be variably combined, flushed and replaced with other such cathode elements to accomplish rapid recharging of a battery cell in accordance with aspects of the present invention. Cathode element 503 may comprise any suitable cathode matter, such as Aluminum, among many other possible elements, alloys and other materials, in a skeleton 505, which may be comprise multi-valent outer contact surfaces 507, electrically connected with one another and the remainder of the skeleton 505, for example, through central bridging 509, which is also comprised in the skeleton 505. Skeleton 505 may also comprise crystals 511, or other cathode materials, for accepting ions (such as Li+ ions) or other electrolytic products or aspects from a surrounding electrolyte(s). Skeleton 505 preferably is ciliated, reticulated or contains other surface-area maximizing features, such as the examples shown as 513, that are thinly constructed (for example, 7-30 microns in width, to maximize the ion acceptance capacity of cathode element 503. Crystals 511 preferably coat, impregnate or are otherwise comprised throughout at least the surface of each such surface feature.

Due to their size and shape, contacts 507 also serve to protect surface features 513 and crystals 511, while permitting electrolyte to enter and interact with them. As a result, a multitude of cathode elements 503 may be piled or otherwise variably grouped together while maintaining electrical contact with one another, but avoid destroying one another, for example, when variably flushed with a surrounding electrolyte. Protecting contacts 507 may take a wide variety of alternate forms to protect crystals 511, or other cathode structures, such more completely covering and porous structures, or a single or multiple such contacts 507, as long as the pores are sufficiently large to allow at least the Lithium ion (or other similar electrolyte) enter. As with battery cell 101, discussed above, cathode element 503 may contain magnetic dipole(s), or a ferromagnetic material, which may variably react with, and may be used with an external magnetic field, which itself may be variable, to encourage binding and electrical contact between a plurality of such cathode elements in a cathode container, as will be discussed in greater detail, below.

Similar structures, but using anode materials (such as copper, as a skeleton material, and graphite, as a coating material), may also or alternatively be used in a battery cell system permitting variable, rapid flushing to hasten recharging and allow for the repair of battery cells.

Figure 6:
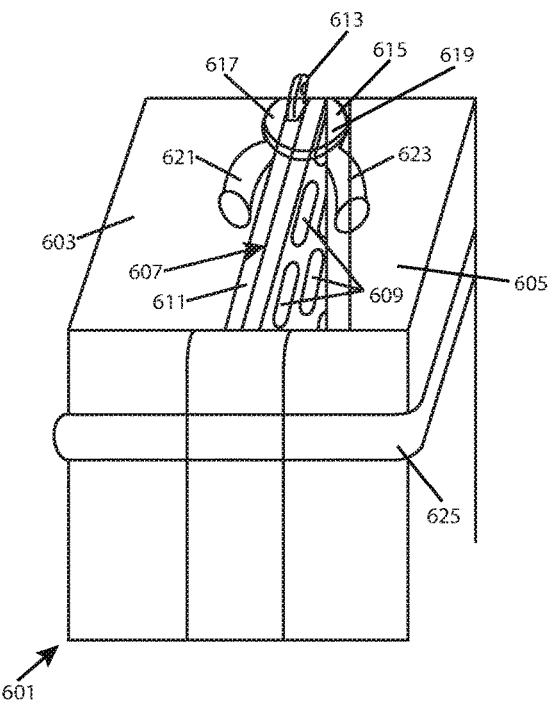
FIG. 6 depicts an exemplary flushable cathode and anode and electrolyte containment system, permitting the variable flushing and filling of a cathode and an anode chamber with electrolyte and cathode and anode elements, such as the elements discussed with reference to FIG. 5.

FIG. 6 depicts an exemplary flushable cathode and anode and electrolyte containment system 601, permitting the variable flushing and filling of a cathode chamber 605 and an anode chamber 603 with cathode and anode elements, respectively, such as element 501, and similar anode element, discussed above. To ease presentation and understanding by showing the inner components of chambers 603 and 605, system 601 is shown without a top containment wall. However, it should be understood that, in a preferred embodiment, such a top containment wall is included, along with five other, or an otherwise complete, set of containment wall(s). An exemplary embodiment of a top containment wall will be discussed with reference to FIG. 7, below.

Cathode chamber 605 and anode chamber 603 may be variably separated by an adjustable dividing wall 607. Dividing wall comprises variable openings, such as those examples shown as 609, and may further comprise a slidable side 611 with at least partially variably-overlapping pores. By actuating a handle 613, which may be actuated by a control system, such as a hardware and software control system described in reference to FIG. 9, below, the amount of fluid flow may be varied, and even brought to zero, with solid portions of side 613 completely covering each opening 609, in some configurations variably selectable by the system and/or user. Inlet channel 615 straddles the dividing wall 607, at the top of containment system 601, as shown, and itself may be divided into two sections, anode feed section 617 and cathode feed section 619, each for separately channeling electrolyte fluid and anode and/or cathode elements into anode chamber 603 and cathode chamber 605, respectively, via distribution tubes 621 and 623. Distribution tubes 621 and 623 are, likewise, respectively dedicated to supplying gel, liquid or other materials from sections 617 and 619 and into anode section 603 and cathode section 605, respectively. As will be explained in greater detail, below, with reference to FIG. 7, inlet channel 615 may be variably sealable by an inlet port, within a top containment wall.

Figure 7:
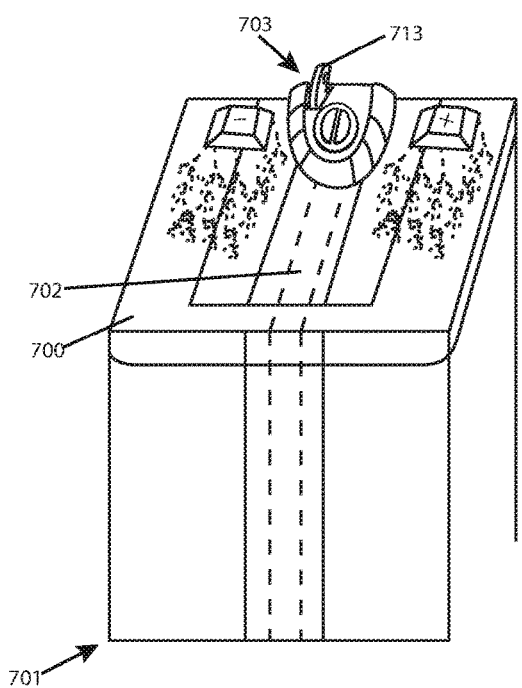
FIG. 7 depicts the same exemplary flushable cathode and anode and electrolyte containment system as in FIG. 6, but including a top containment wall, and other additional aspects of the invention.

FIG. 7 depicts the same exemplary flushable cathode and anode and electrolyte containment system as in FIG. 6 (now 701), but including a top containment wall 700, and other additional aspects of the invention. Containment wall 700, when installed onto system 701, forms an air- and liquid-tight seal, separately closing chambers 603 and 605, preferably, with the aid of sealing strip 702 and sealing rings (not shown in this figure, but shown as 625 in FIG. 6) which preferably comprise an elastomeric material, such as rubber gasket or O-ring material.

An inlet port 703 is also pictured, which also forms an air- and liquid-tight seal, separately, with each section of inlet channel 615 and, variably, with complementary bifurcated nozzle (not pictured) with separate feeding sections and connected tubes for each section of port 703 and channel 615 and, therefore, is capable of separately feeding anode electrolyte and elements into the anode chamber 603 and cathode electrolyte and elements into the cathode chamber. As in other embodiments and aspects of the invention, a lubricant or other suction-improving fluid may be added to the electrolyte and cathode and anode elements, to ease their transfer into system 701. An outlet port, for example, at the base of system 701, may also be provided, to assist in flushing discharged cathode and anode elements from system 701 as new, elements, in a charged and pure condition, are added through port 703. Both port 703 and the outlet port may be variably valved, to prevent unintended leakage while permitting outflow during such a flushing procedure. To aid in flushing each chamber 603 and 605, completely, dividing wall 607 may be placed in a condition closing its variable openings 609 prior to flushing with new electrolyte and materials through port 703, for example, via an actuator moving handle 613 (not pictured) of an external recharging and control system, which may also comprise the bifurcated feed nozzle, discussed above.

Figure 8:
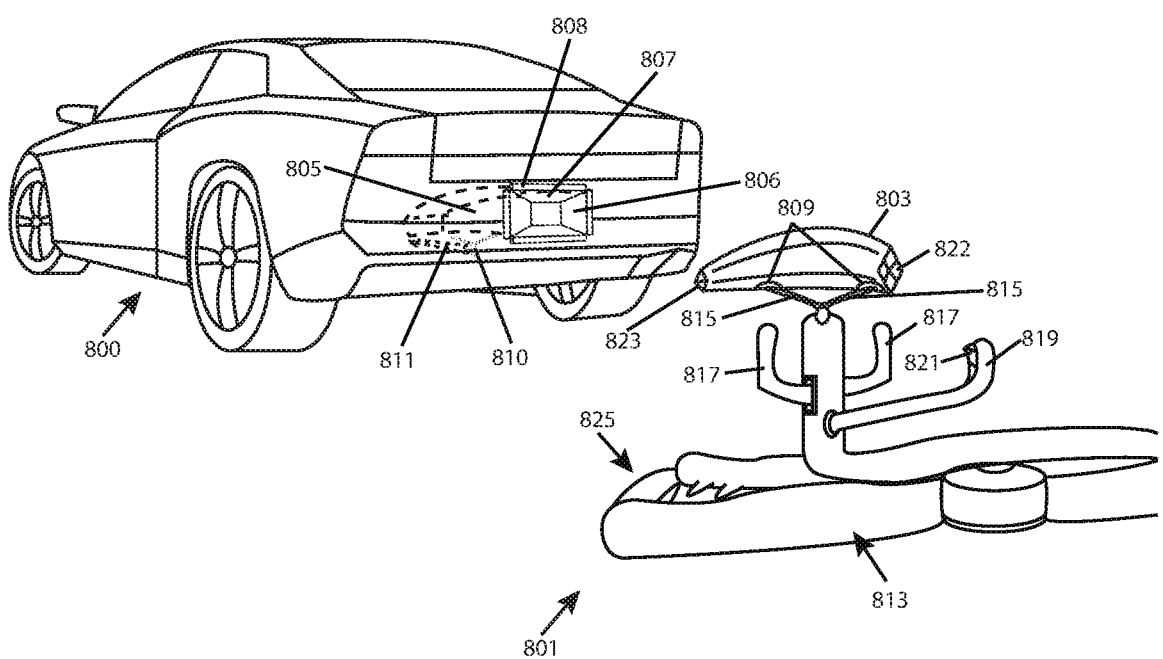
FIG. 8 depicts an exemplary battery reloading system in accordance with aspects of the present invention, in the context of restoring or changing power resources for an electric motor vehicle.

FIG. 8 depicts an exemplary battery reloading system 801 in accordance with aspects of the present invention, in the context of restoring or changing power resources for an electric motor vehicle 800. Rather than attempt to charge a battery on-board the vehicle 800, system 801 provides a system for rapidly inserting a freshly charged and/or otherwise restored ("new") battery 803, preferably with a streamlined, torpedo structure into a complementarily-shaped battery receiving and mounting bay, 805, within the motor vehicle 800. A variable one-way receiving port 806, which may permit injection of a new battery, but may also prevent its escape through valve louvers 807, which may rotate about axes at the center of louver joints 808, inward, to permit the entry of a new battery 803, but which louvers also collide with one another when encountering reverse force from a battery that has been installed in bay 805. Once installed within bay 805, anode and cathode contacts 809 (and optional data delivery contacts, not separately pictured), of battery 803 may permit battery 803 to deliver electrical power to the motor vehicle 800 via a contact harness 810 within bay 805, unless and until the battery 803 is ejected.

Preferably, from the same process of the maneuver for loading the new battery, the system 801 may eject another, preferably, more depleted, but similarly-shaped ("old") battery, if present, via a variable exit or release gate 811, at a different point in bay 805 than the entrance point of the new battery. Also preferably, the new battery may aid, along with gravity, in pushing the old battery out of the bay, and/or triggering release gate 811 to open (releasing the old battery) and then return to a closed, locked position, as the new battery is loaded and, in the process, electrical contacts on the new and/or old battery linked to control system hardware (such as control system hardware set forth below, with reference to FIG. 9) relay information to a control system relating to the final charge states, capacity and other specifications of both the old and new battery. Also preferably, the control system may determine a net amount of additional power, and other quality gains or exchange results, affecting the motor vehicle, and may aid in determining a proper monetary cost to be applied to a user requesting such a reloading maneuver as described herein, via data derived from front and rear contacts (discussed further below). Such information may be ascertained by the system earlier, however and, for example, prior to carrying out the exchange. In some embodiments, a user may request different charge, capacity and other battery characteristics, pay for them in advance, and if payment clears, the system may select a new battery for replacing the user's old battery to accomplish the different qualities requested and/or paid for by the user.

The battery reloading maneuvers described above may be accomplished, in part, with the aid of a loading rig 813. Loading rig 813, as with the motor vehicle 800, may have its own contact harness 815, to temporarily electrically connect to contacts 809 of batteries such as 803, if and when they are held on the rig (as pictured). Actuable gripping arms 817 and pushing arm 819 may aid harness 813, and the operators and/or system utilizing it to load battery 803 into bay 805 via one-way receiving port 806. An informational electronic plug or contact set 821 may ascertain information from battery 803 and the replaced battery, via complementary rear contacts 822, while arm 819 pushes battery 803 into place, and its front contacts 823 communicate with rear contacts from the old battery, with which they touch. In some embodiments, harness 815 may extend to front and rear contacts 823 and 822, accomplishing both data transfer and power delivery aspects of the invention, and separate contacts 809 may be omitted (or vice versa). Carriage 813, or another container to which carriage 813 delivers an old battery, for example, captured by bay-drop net or cantilever 825, may accomplish recharging of an old battery ejected from bay 805 in the exchange process, after bay-drop net or cantilever 825 has caught it.

Figure 9:
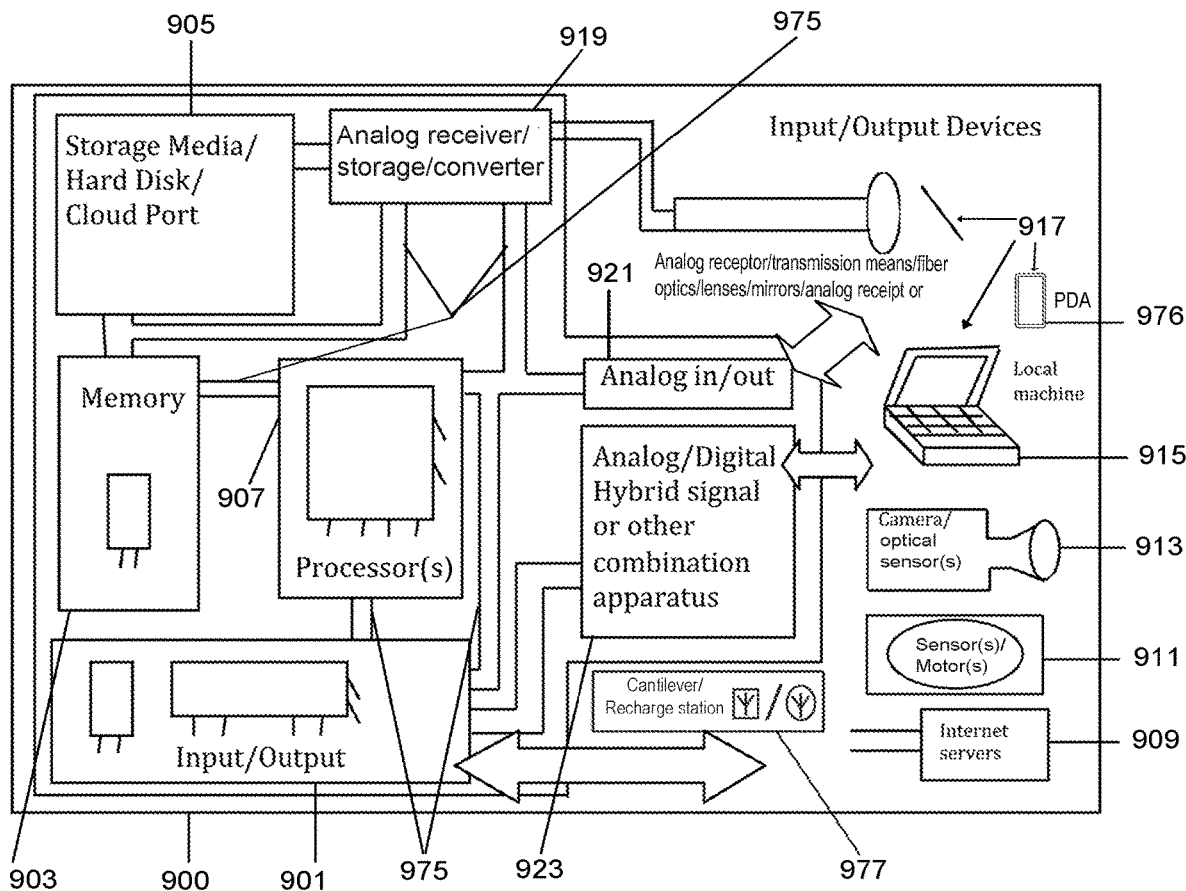
FIG. 9 is a schematic block diagram of some elements of an exemplary hardware and software control system that may be used in accordance with aspects of the present invention.

FIG. 9 is a schematic block diagram of some elements of an exemplary control system 900 that may be used in accordance with aspects of the present invention, such as, but not limited to, actuating sensors, motors, battery charging operations and station machinery (such as, but not limited to battery-swapping armatures and flushing mechanisms, and determining currents and amounts for recharge and execute transactions with users), other actuators in connection with structural aspects, such as braces and frame pieces, and driving current and current patterns for recharging. The generic and other components and aspects described herein are not exhaustive of the many different systems and variations, including a number of possible hardware aspects and machine-readable media that might be used, in accordance with the present invention. Rather, the system 900 is described to make clear how aspects may be implemented. Among other components, the system 900 includes an input/output device 901, a memory device 903, storage media and/or hard disk recorder and/or cloud storage port or connection device 905, and a processor or processors 907. The processor(s) 907 is (are) capable of receiving, interpreting, processing and manipulating signals and executing instructions for further processing and for output, pre-output or storage in and outside of the system. The processor(s) 907 may be general or multipurpose, single- or multi-threaded, and may have a single core or several processor cores, including, but not limited to, microprocessors. Among other things, the processor(s) 907 is/are capable of processing signals and instructions for the input/output device 901, analog receiver/storage/converter device 919, analog in/out device 921, and/or analog/digital or other combination apparatus 923 to cause a display, light-affecting apparatus and/or other user interface with active physical controls, such as a charging station pump (any of which may be comprised or partially comprised in a GUI) to be provided for use by a user on hardware, such as a personal computer monitor or PDA (Personal Digital Assistant) screen (including, but not limited to, monitors or touch- and gesture-actuable displays) or terminal monitor with a mouse and keyboard or other input hardware and presentation and input software (as in a software application GUI), and/or other physical controls. Alternatively, or in addition, the system, using processors 907 and input/output devices 919, 921 and/or 923, may accept and exert passive and other physical (e.g., tactile) user and environmental input and output.

For example, and in connection with aspects of the invention discussed in reference to the remaining figures, the system may carry out any aspects of the present invention as necessary with associated hardware and using specialized software, including, but not limited to, controlling the placement of recharging contacts and flushing nozzles on rechargeable, flushable battery sections, actuating magnetic fields to align batteries in a battery tank, controlling the flow and patterns of current, power usage, power and current buffering (for example, using capacitors or a capacitor bank) and using attached sensor/motors and other actuating devices and system-wide interfaces to effect aspects of a recharging system. The system may also, among many other things described for control systems in this application, respond to user, sensor and other input (for example, by a user-actuated GUI controlled by computer hardware and software or by another physical control) to activate/deactivate recharging systems and pumps, store batteries and monitor their status in an inventory, exchange batteries and determine net power, capacity and other exchanges with users, or perform any other aspect of the invention requiring or benefiting from use of a control system. The system 901 may also permit the user and/or system-variation of settings, including but not limited to the affects of user activity on modes of operation of the system, and send external alerts and other communications (for example, to users and administrators) via external communication devices, for any control system aspect that may require or benefit from such external or system-extending communications.

The processor 907 is capable of processing instructions stored in memory devices 903 and/or 905 (and/or ROM or RAM), and may communicate with any of these, and/or any other connected component, via system buses 975. Input/output device 901 is capable of input/output operations for the system, and may include/communicate with any number of input and/or output hardware, such as a computer mouse, keyboard, entry pad, actuable display, networked or connected second computer, other GUI aspects, camera(s) or scanner(s), sensor(s), sensor/motor(s), range-finders, GPS systems, receiver(s), transmitter(s), transceiver(s), transflecting transceivers ("transflecters"), antennas, electromagnetic actuator(s), mixing board, reel-to-reel tape recorder, external hard disk recorder (solid state or rotary), additional hardware controls (such as, but not limited to, buttons and switches, and actuators, current or potential applying contacts and other transfer elements, light sources, speakers, additional video and/or sound editing system or gear, filters, computer display screen or touch screen. It is to be understood that the input and output of the system may be in any useable form, including, but not limited to, signals, data, commands/instructions and output for presentation and manipulation by a user in a GUI. Such a GUI hardware unit and other input/output devices could implement a user interface created by machine-readable means, such as software, permitting the user to carry out any of the user settings, commands and input/output discussed above, and elsewhere in this application.

901, 903, 905, 907, 919, 921 and 923 are connected and able to communicate communications, transmissions and instructions via system busses 975. Storage media and/or hard disk recorder and/or cloud storage port or connection device 905 is capable of providing mass storage for the system, and may be a computer-readable medium, may be a connected mass storage device (e.g., flash drive or other drive connected to a U.S.B. port or Wi-Fi) may use back-end (with or without middle-ware) or cloud storage over a network (e.g., the internet) as
either a memory backup for an internal mass storage device or as a primary memory storage means, or may simply be an internal mass storage device, such as a computer hard drive or optical drive.

Generally speaking, the system may be implemented as a client/server arrangement, where features of the invention are performed on a remote server, networked to the client and made a client and server by software on both the client computer and server computer. Input and output devices may deliver their input and receive output by any known means of communicating and/or transmitting communications, signals, commands and/or data input/output, including, but not limited to, input through the devices illustrated in examples shown as 917, such as 909, 911, 913, 915, and 977 and any other devices, hardware or other input/output generating and receiving aspects. Any phenomenon that may be sensed may be managed, manipulated and distributed and may be taken or converted as input or output through any sensor or carrier known in the art. In addition, directly carried elements (for example a light stream taken by fiber optics from a view of a scene) may be directly managed, manipulated and distributed in whole or in part to enhance output, and whole ambient light or other RF information for an environmental region may be taken by a series of sensors dedicated to angles of detection, or an omnidirectional sensor or series of sensors which record direction as well as the presence of electromagnetic or other radiation. While this example is illustrative, it is understood that any form of electromagnetism, compression wave or other sensory phenomenon may include such sensory directional and 3D locational information, which may also be made possible by multiple locations of sensing, preferably, in a similar, if not identical, time frame. The system may condition, select all or part of, alter and/or generate composites from all or part of such direct or analog image or other sensory transmissions, including physical samples (such as DNA, fingerprints, iris, and other biometric samples or scans) and may combine them with other forms of data, such as image files, dossiers or metadata, if such direct or data encoded sources are used.

While the illustrated system example 900 may be helpful to understand the implementation of aspects of the invention, it is understood that any form of computer system may be used to implement many control system and other aspects of the invention—for example, a simpler computer system containing just a processor (datapath and control) for executing instructions from a memory or transmission source. The aspects or features set forth may be implemented with, and in any combination of, digital electronic circuitry, hardware, software, firmware, or in analog or direct (such as electromagnetic wave-based, physical wave-based or analog electronic, magnetic or direct transmission, without translation and the attendant degradation, of the medium) systems or circuitry or associational storage and transmission, any of which may be aided with enhancing media from external hardware and software, optionally, by wired or wireless networked connection, such as by LAN, WAN or the many connections forming the internet or local networks. The system can be embodied in a tangibly-stored computer program, as by a machine-readable medium and propagated signal, for execution by a programmable processor. The method steps of the embodiments of the present invention also may be performed by such a programmable processor, executing a program of instructions, operating on input and output, and generating output. A computer program includes instructions for a computer to carry out a particular activity to bring about a particular result, and may be written in any programming language, including compiled and uncompiled, interpreted languages, assembly languages and machine language, and can be deployed in any form, including a complete program, module, component, subroutine, or other suitable routine for a computer program.

Figure 10:
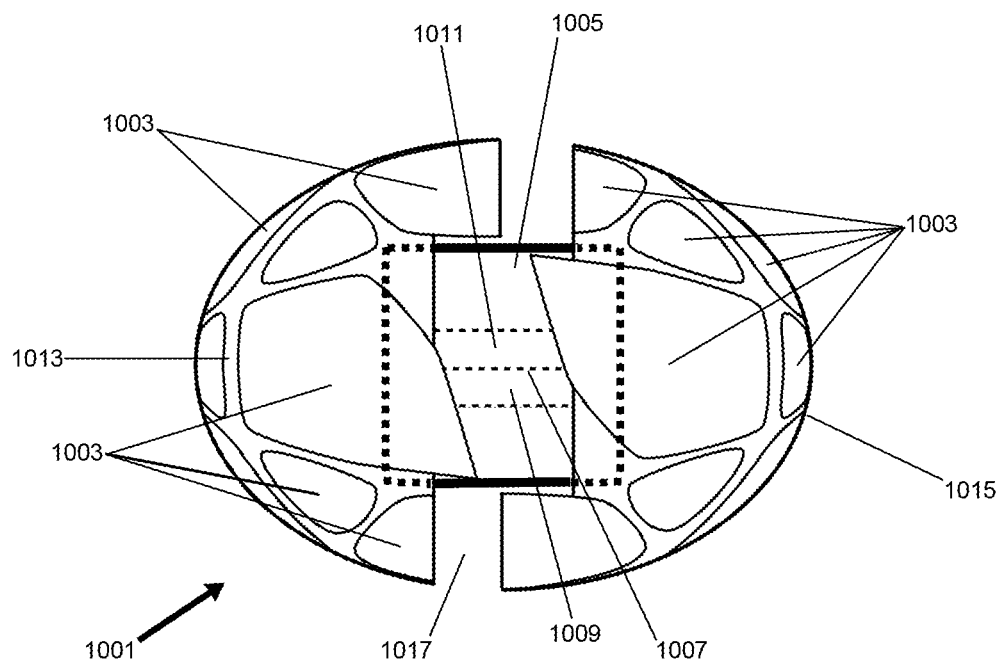
FIG. 10 is a side view of an exemplary 3-dimensionally self-guided battery cell that may be used along with several other such cells, in a charging gel or fluid, in accordance with aspects of the invention.

FIG. 10 is a side view of an exemplary 3-dimensionally self-guided battery cell 1001, which may be used along with several other such cells, in an interstitial gel, liquid, gas, suspension or fluid, in accordance with aspects of the invention. As with other exemplary battery cells set forth in the present application, such as battery cell 101, cell 1001 is a complete battery, capacitor, or another device able to deliver current for use in an appliance, and the precise form and number of illustrative components illustrated is exemplary only, to aid in understanding aspects of the present invention. Some aspects of cell 1001 are similar to aspects set forth for such other exemplary battery cells set forth in this application. For example, cell 1001 is configured to expand, and decrease density, when particular conditions occur within cell 1001.

In addition to aspects of battery cells set forth elsewhere in this application, however, cell 1001 has a number of other unique aspects. For example, cell 1001 is able to navigate more freely when immersed within a group of other, similar cells than cell 101. Several chargeable outer domains, such as exemplary outer domains 1003, in conjunction with similar chargeable domains on neighboring cells, aid in moving guiding cell 1001 to different, sought locations. Domains 1003 also serve as variable, selectable contacts, for altering conduction through cell 1001, in accordance with such neighboring domains or potential neighboring domains, of neighboring or nearby, similar cells (or appliance contacts). Domains 1003 preferably substantially cover and tessellate the outer surface of cell 1001, while maintaining separate conduction. In some embodiments, separate domains 1003 are provided for locomotion of cell 1001 and for contacts and electrical or other connections with neighboring domains of similar cells.

To aid in these self-guiding actions, a local control unit 1005 (such as the control unit set forth in reference to FIG. 9, above) may control all controllable hardware within cell 1001, which includes, but is not limited to, the following. Switches may be comprised in each cell 1003 for turning on and turning off, and allowing or prohibiting conduction through, any of domains 1003, as well as amplifiers or electromagnets for selectively and individually increasing the electrostatic or magnetic charge of any domain; sensors for determining the location and electrostatic, magnetic or conduction characteristics of neighboring domains of other cells. Each cell 1003 may comprise self-diagnostic hardware, for sensing the charge state, capacity and any other internal conditions of the cell, as well as communications equipment (such as an antenna) for communicating such conditions or instructions for locomotion to neighboring cells (such as instructing neighboring cells to magnetize a domain near its own domain, in reverse, to cause the two domains to mutually attract, moving the cell(s). If the charge state of anode, cathode and electrolyte material within cell 1001 is too low for safe operation, the control unit may disengage those materials from domains 1003, or other circuit-completing contacts, and take further measures to remove cell 1001 from an immersion of other, similar cells (as discussed in greater detail, below). Alternatively, or in addition, control unit 1005 may control hardware for bypassing those materials, and maintaining a pass-through circuit with other, neighboring cells and their domains in contact with domains of cell 1001. Control unit 1005 may comprise a separate source of power for maintaining its own operations controlling cell 1001 hardware, in addition to the battery components and materials discussed above. Each cell may comprise a variable-length, extendable and contractible bridge 1007, which may be motorized, powered and connected for communications with control-system 1005. For example, two slidably-engaged, but interconnected, ratcheting rails, 1009 and 1011, may be included in bridge 1007. But any suitable linear actuator known in the art may be used as bridge 1007, which may be connected at opposite ends to each of two sections, 1013 and 1015, of cell 1001, may be used. Using extendable/contractible bridge 1007, the control unit can move cell 1001 upward or downward in an immersion with other, similar cells, by changing its density through expansion, in accordance with aspects of the invention for cells set forth elsewhere in this application. Control unit 1005 is preferably located at the center of cell 1001 at any degree of expansion by bridge 1007, or otherwise maintains the center of gravity of cell 1001—for example, at or near the spatial center of cell 1001—regardless of how extended bridge 1007 is. As bridge 1007 extends, decreasing the density of cell 1001, cell sections 1013 and 1015 move away from one another, and may create an internal gap or space, 1017 (as pictured). Conversely, when bridge 1007 is contracted, sections 1013 and 1015 move toward one another, unless and until gap 1017 is closed, resulting in a denser, more spheroid form factor for cell 1001.

The implementation of locomotion of cell 1001, via control system 1005, and in conjunction with neighboring cells in which it is immersed, is discussed in greater detail below.

Figure 11:
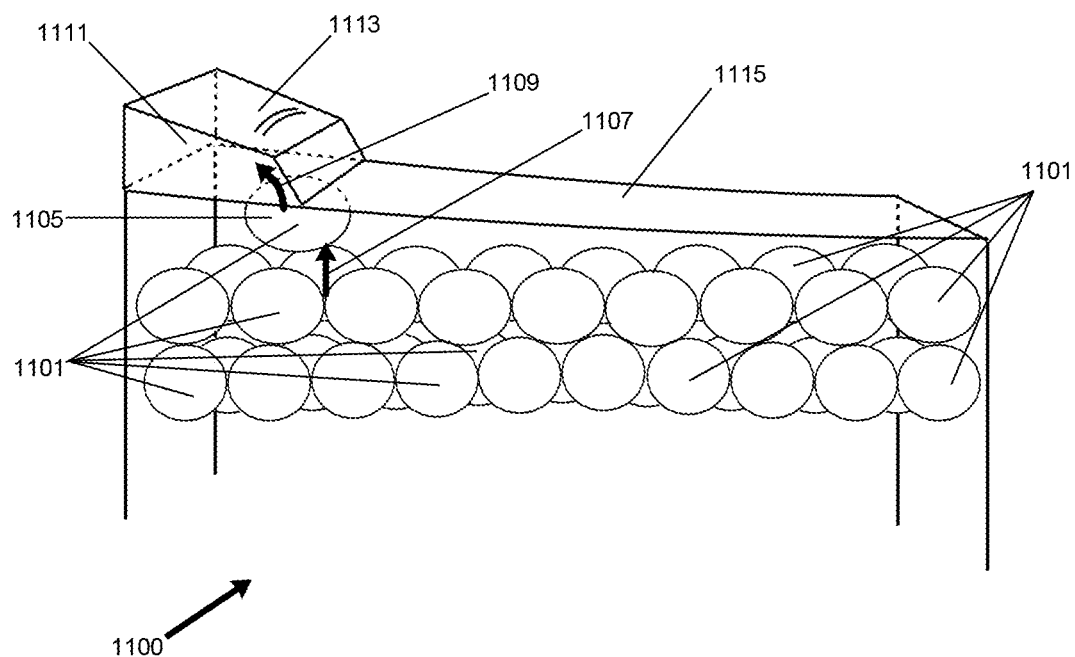
FIG. 11 is a perspective drawing of another battery cell fluid tank, including several battery cells such as the example provided in FIG. 10, above, in accordance with aspects of the present invention.

FIG. 11 is a perspective drawing of another battery cell fluid tank 1100, including several battery cells, such as the examples pictured as 1101, similar in nature to the example provided in FIG. 10, above, in accordance with aspects of the present invention. Tank 1100 may have include any of the other hardware and aspects set forth above for battery storage and use tanks that hold and connect groups of battery cells. Within such a group, and with attention to particular objectives for cell locomotion, the self-locomotion aspects of cell 1001, and similar cells discussed herein, may be better understood. For simplicity, each sub-feature of cells 1101, as discussed above in reference to FIG. 10, are not pictured. However, it should be understood that each such sub-feature and aspect, and discussed potential sub-feature and aspect, may be included.

The separate, selective actuation of any of the domains 1003 (not pictured in the present figure) of each cell 1101, in conjunction with the activation of neighboring domains of neighboring cells, may yield several forms of locomotion for any of cells 1101 (or any other such cell). For example, by activating any domain with a charge opposite to a domain of another cell, neighboring it, exemplary cell 1105 will be drawn toward that other cell. By selecting such a domain and activation, or multiple such domains and activations, among numerous such domains all around cell 1105 (in which they are mutually immersed) acceleration and force vectors in virtually any direction can be selected and carried out. As another example, the cells may spin in any 3-dimension direction of rotation, for example, counter-clockwise in the perspective of the drawing, by activating a positive domain at the bottom and near the right end of cell 1105, abutting a positive domain at the top of another cells domain immediately below it.

With many such domain selections and activations, in a sequence, a wide variety of movement pathways for cell 1105 can also be selected and carried out, in accordance with a locomotion plan created by a user or control unit, or multiple users or control units (within and outside the cells), which all may be in communication with one another. A hierarchy to resolve different, conflicting commands from different users and control systems, and designate a master control unit to control decision-making may be devised. For example, a master control unit may be designated (for example, during a handshake protocol between all cells in an immersion). Such handshake protocols may determined and altered by order of communication initiation, quality or proximity to information used in a locomotion decision, or by a randomly assigned tie-breaking priorities (or any combination of such factors and other factors). In addition to domain activation, other movements actuable by the control system 1005, such as the expansion and contraction aspects, and battery delivery hardware discussed elsewhere in this application may also be factored in or controlled by the control unit(s) of the invention, to aid in locomotion of cell 1105, and similar cells.

The preconditions and motivations for such mutual domain actuation and self-locomotion are so widespread as to be impossible to fully list. However, generally, those reasons include, but are not limited to, ordering cells to complete optimal circuits or potential circuits or circuit components, and removing a depleted or flawed cell from a group of cells in which the cell is immersed.

For example, exemplary cell 1105 has been drawn up, and out of a pool of the other, similar cells 1101, along the trajectory of force vector arrow 1107. The control system, which may be resident within cell 1105, through monitoring sensors and other hardware, as discussed above, determined that cell 1105 has too low a charge, or is damaged, or has another condition rendering its continued use in power circuits within tank 1100 unsafe or otherwise not optimal. Thus, cell 1105 implemented the locomotion techniques set forth above to expel itself, up and out of the pool of other cells. For example, its on-board control unit may have commanded its connected, on-board linear actuator to expand the profile of cell 1105, making it less dense (as pictured) and causing it to rise upward. In addition, its control unit may have activated domains on the left-hand side of cell 1105, creating a positive electrostatic or magnetic charge pole, neighboring negative electrostatic charges and magnetic poles on domains of other cells 1101 on cells neighboring cell 1105, that it or other control systems created (and/or matching charges or dipole pairings on the opposite side of cell 1105). Thus, cell 1105 may also have been moved leftward, in addition to upward, in the perspective of the figure, as shown with vector arrow 1109. As a net result, and the underlying motivation for the maneuver, cell 1105 is moved from the pool of similar cells 1101, and toward a sequestration and recovery container section 1111. In this container section, cell 1105 can be eliminated from the pool without interfering in any way with the proper function of the remaining cells 1101. Container section 1111 also permits a rapid, separate removal and recovery of cell 1105, through access door 1113.

Tank 1100 also comprises an upper tank ramp 1115. Ramp 1115, which may itself comprise contacts and/or locomotion domains, can aid in shuttling cell 1105 leftward, in the perspective of the figure, to aid in sequestration and removal via section 1111.

It should be understood that the exemplary movements, and underlying reasons for cell locomotion are exemplary only, and that a wide range of other preconditions or considerations could base an action by control system(s) and users for cell locomotion according to the methods and techniques set forth herein.

Figure 12:
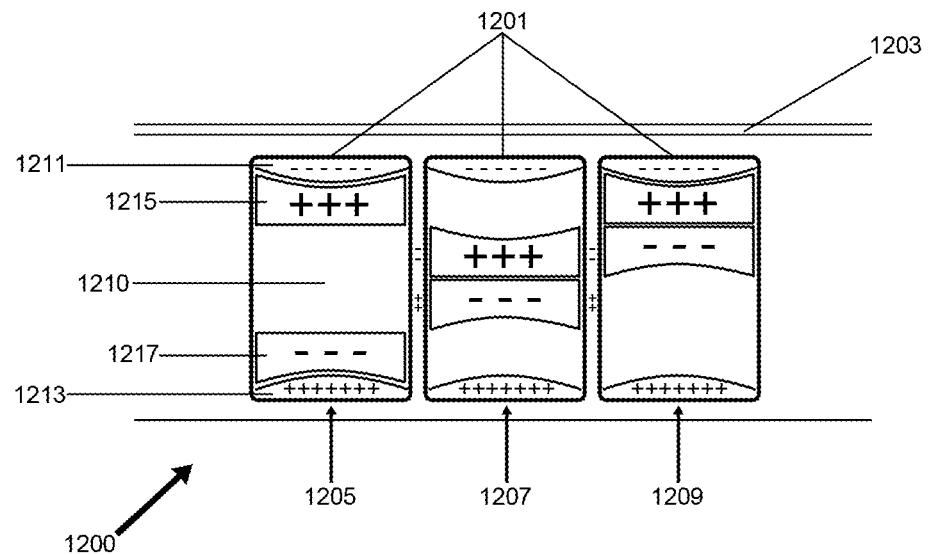
FIG. 12 depicts an exemplary transfer medium for facilitating the efficient, rapid transfer of data and energy.

FIG. 12 depicts aspects of an exemplary transfer medium 1200 for facilitating the efficient, rapid transfer of both data and energy by a single mechanism. Transfer medium 1200 comprises several exemplary information- and energy-carrying subunits, such as the examples pictured as 1201. It should be under stood that the type and number of subunits is illustrative only, and that, in practice, such subunits may not be as uniform, and may be many more in number, and arranged in many different patterns and shapes. The linear order, physical makeup and limited number is primarily for ease of understanding. As will be explained in greater detail below, in some embodiments, a solid medium is not used and, instead, wireless energy and data transfer methods are implemented.

The information- and energy-carrying subunits 1201 are pictured mounted on a physical substrate 1203, holding them in a position and order to be written with data, and/or read for data while simultaneously harvesting power from them. As will be explained in greater detail below, a specialized read/write head may be used to carry out such activities, and other aspects of the present invention. In some embodiments, a single act of a read/write head may be used to simultaneously read or write data and harvest or embed harvestable energy into the information- and energy-carrying subunits 1201, and medium 1200 generally.

Each energy-carrying subunit 1201 is shown in a different state, with a different potential energy (transferable energy held within them) and a different datum stored within them. Subunit 1205 is the first of these energy-carrying subunits when reading or writing medium 1200 from left-to-right, in the perspective of the figure, followed by subunit 1207 and 1209. Each subunit 1201 comprises two opposite major magnetic or electrostatic domains, 1211 and 1213, at each end of an open channel, such as example 1210. Within each channel such as 1210 are two switchable mobile shuttles, such as examples 1215 and 1217 within channel 1210 of subunit 1205, configured to slide vertically within the channel (in the perspective of the figure) and themselves each carrying an electrostatic charge or magnetic dipole—opposite to the major magnetic or electrostatic domain directly facing it within the channel 1210, as pictured, and opposite to one another. Preferably, the switchable shuttles may rest at multiple positions within the channel, any thereby store various levels of potential energy and data. The condition of the shuttles, and which position where they are at rest, correspond to a different state of the subunit within which they are located. Some such states will be discussed in greater detail via examples, below.

Within subunit 1205, shuttles 1215 and 1217 are each resting at against the domain directly facing it, namely, domain 1211 and 1213, respectively. Although a number of domains are or will be discussed, within each subunit 1201, it should be understood that domains 1211 and 1213 are the strongest resting domains. By resting domains, this application is referring to domains that are not actuated to become larger or smaller. However, in some embodiments, other than that exemplified currently, all domains are actuable by a control system (able to be made stronger, with a greater electrostatic charge or dipole, by charge transport or magnetic field generation of a control system connected with each domain). Because they are the strongest resting domains, 1211 and 1213 are able to overcome other domains and attract shuttles 1215 or 1217 when at a greater distance, in comparison with weaker domains. To be placed in the state pictured in subunit 1205, therefore, each shuttle, 1215 and 1217, had to be forced away from a higher energy state, and forced close enough to domain 1211 or 1213 to cause an attraction overcoming competing attractions to weaker domains. This occurs at some point where each shuttle is further away from domains 1211 or 1213 than those weaker domains. As a result, after reaching that point, the magnetic or electrostatic forces of the subunit result in the shuttles transitioning from one, lower energy state, toward another, higher energy state. As they transition from a high to a low-energy state, the shuttles are able to perform work, as they travel in their channel, such as 1210 in he instance of shuttles 1215 and 1217. This ability to perform work is exploited in an energy harvesting operation (which may be simultaneous and the same as a data reading or writing operation), using a read/write head, as discussed in greater detail below in reference to FIG. 13.

One such higher energy state, as discussed above, is illustrated in subunit 1207. The shuttles in subunit 1207 are shown mutually attracted together, at a central position within a channel similar to channel 1210 (but within subunit 1207) and are encouraged in that central position by weaker vertical domains 1219 and 1221. The positions of the shuttles pictured in subunit 1207 correspond with a higher potential energy state than that pictured in subunit 1205 because the domains within each shuttle and vertical domains 1219 and 1221 are weaker than, and manifest a weaker attraction, than that possible with domains 1211 and 1213, as discussed above.

An intermediate energy state, between the energy levels set forth in examples 1205 and 1207, is illustrated in subunit 1209. In subunit 1209, one shuttle is held against the strong domain facing it (namely, toward the top of subunit 1209's channel), but the other shuttle is pulled away from the strong domain facing it (namely, the domain at the bottom). This different, intermediate energy state which may be used to harvest energy or implant energy in medium 1200, also corresponds with another different, intermediate data state carried by subunit 1209, which can be simultaneously read or rewritten, for example, in accordance with further procedures set forth below in reference to FIG. 13.

Figure 13:
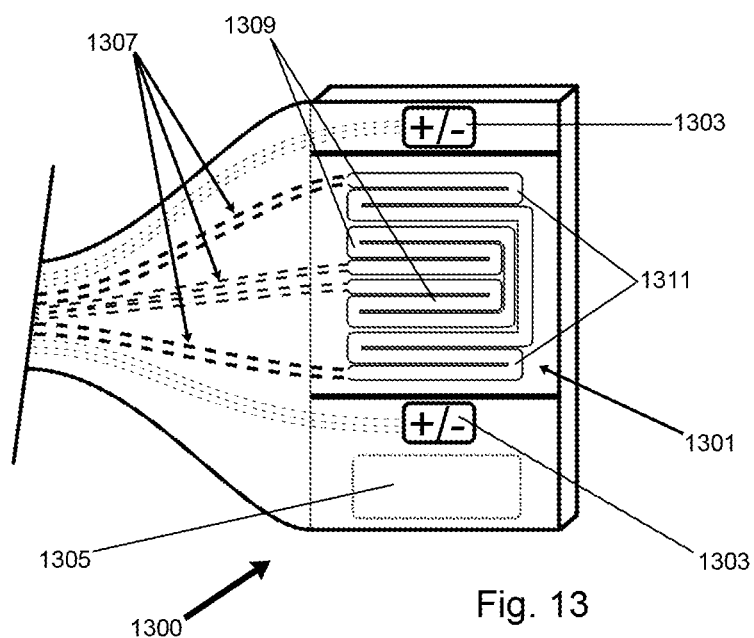
FIG. 13 depicts an exemplary data and energy receiver, which may be used to receive data and energy simultaneously, for example, by receiving the exemplary transfer medium set forth above, in reference to FIG. 12.

FIG. 13 depicts aspects an exemplary data and energy receiver/writer 1300, which may be used to receive data and energy simultaneously, for example, by receiving the exemplary transfer medium set forth above, in reference to FIG. 12. Data and energy receiver 1300 may be held and maneuvered to pass over each subunit, such as the subunits set forth above in reference to FIG. 12, above, of an energy and data transfer medium such as exemplary medium 1200, for example, via a motorized armature (not pictured), or by a fixed structure, while the medium passes under it—and thereby carry out the operations set forth below. While passing over each subunit, in the same orientation pictured for receiver 1300 and medium 1200 (but with receiver 1300 placed over medium, closer to the viewer of the figure), at least some of conductive coils 1301 pass directly over each of the medium subunit's shuttles. As they so pass, if those shuttles move vertically within the channels in which they are slidably mounted, their electrostatic or magnetic domains induce an electric current within those coils. To induce that movement, actuable domains 1303 are connected to a control system 1305, which may be the control system set forth above, in reference to FIG. 9. Actuable domains 1303 may be charged or magnetized by the control system, either positively or negatively in the direction facing each shuttle, to push or pull each or both of the domains of each shuttle within the medium as receiver passes over them. In so doing, exact amounts of energy may be used to put each shuttle in just the position necessary, and not substantially farther, to allow the shuttles to shift to a new state (other than the one they previously occupied) under the force of a domain within the medium subunit (as those shifts in state are discussed above, in reference to FIG. 12). As they so transition, and shift vertically, each shuttle then induces electricity in at least one of the coils 1301, which control system 1305 may then harvest and store with circuits and energy storage hardware (e.g., comprising battery(ies) or capacitor(s)) under its control comprising that wiring. The electricity then passes through wiring 1307 attached to the coils and to a control system, where they may be stored by charging a battery, capacitor or other energy storage device, and/or repurposed for use in the circuit of an appliance.

Coils 1301 are preferably present in multiple opposing pairs, such as pair 1309 and pair 1311, each member of a given pair passing over a shuttle with an opposite charge from the other member when receiver/writer passes over a media subunit. In this way, a separate circuit, with separate wiring (as pictured) can be maintained for each pair, 1309 and 1311, for harvesting electrical energy from the shuttle movements. Also, as receiver 1300 passes over each subunit, it may be determined by the control system which pair has been induced more strongly, or whether the induction has been even, as well as at what levels of voltage, resistance and/or current. In this way, the state of the shuttles in each subunit may be determined, both by induction resulting from the movement of the receiver as it passes over a subunit, and by the movement of the shuttles in response to "bumping"—i.e. the pushing or pulling of the shuttles caused by each actuable domain 1303.

As mentioned above, aspects of the present invention are not limited to the exact, illustrative examples and embodiments set forth above. As will be readily apparent as disclosed, and to those of ordinary skill in the arts to which this application pertains, a number of differing, alternative structures and approaches may be employed while still carrying out the invention. For example, innumerable forms and formats of media and multiple receivers, receiver/writers and differing head and coil layouts may be used, instead of the exact form of the receiver/writer illustrated. Although physical coils, implementing induction for energy harvesting, are shown, any known energy harvesting may also be used in conjunction with data transfer in a single act, to carry out aspects of the invention. For example, and as discussed above, in some embodiments, the receiver may be an antenna, and the medium may comprise a wireless transmission of both data and energy. In that embodiment, the antenna is preferably connected to, or energy therefrom is routed to, an energy storage device, such a capacitor or battery, or bank thereof, connected to the antenna. In some embodiments, a modulated wireless signal is harvested for energy by allowing greater electrical current resulting from particularly high-energy modulations to induce a greater electrical current and energy storage. In further embodiments, the signal may be further boosted at such higher-energy modulation points, to exaggerated differentials in the waveform, and ease the harvesting of energy by the system. To carry out that boosting, preferably a control system, such as the control system set forth in FIG. 9, may be used in conjunction with a connected amplifier within the energy reception or storage circuits.

I claim:

1. A system for data and energy transfer, comprising:
   a control system, comprising a data and energy receiver;
   a data- and energy-channeling device; and
   a non-transitory transfer medium comprising data- and energy-carrying subunits,
   wherein said data- and energy-carrying subunits are configured to hold multiple data and energy states, and
   wherein said data and energy receiver is configured to both read data and receive energy from each of said data- and energy-carrying subunits in a first physical movement, in a first direction, by at least part of said energy receiver or at least part of said subunits.

2. The system for data and energy transfer of claim 1, wherein said data- and energy-carrying subunits comprise domains.

3. The system for data and energy transfer of claim 1, wherein said domains comprise electrostatic domains.

4. The system for data and energy transfer of claim 1, wherein each information- and energy-carrying subunit of said non-transitory transfer medium comprises different possible data and energy states, and wherein said different possible data and energy states comprise at least one first state and at least one second state.

5. The system for data and energy transfer of claim 4, wherein said different possible data and energy states comprise at least three different states, comprising said at least one first state and said at least one second state.

6. The system for data and energy transfer of claim 5, wherein said different possible data and energy states comprise at least four different states, comprising said at least one first state and said at least one second state.

7. The system for data and energy transfer of claim 1, wherein said control system comprises an amplifier, configured to boost a modulated carrier wave, from a first energy level to a second energy level, facilitating energy harvesting by a receiver.

8. The system for data and energy transfer of claim 1, wherein said data and energy receiver is configured to both provide data and store energy into each of said data to and energy-carrying subunits in a single physical movement, in one direction, by at least part of said energy receiver or at least part of said subunits.

9. A method for data and energy transfer comprising the following steps:
   providing a system for data and energy transfer, comprising:
      a control system, comprising a data and energy receiver;
      a data- and energy-channeling device; and
      a non-transitory transfer medium comprising data- and energy-carrying subunits,
      wherein said data- and energy-carrying subunits are configured to hold multiple data and energy states, and wherein said data and energy receiver is configured to both read data and receive energy from each of said data- and energy-carrying subunits in a first physical movement, in a first direction, by at least part of said energy receiver or at least part of said subunits.

10. The method for data and energy transfer of claim 9, comprising the following additional step:
obtaining both data and energy from each of said data- and energy-carrying subunits in a single physical movement.

11. The method for data and energy transfer of claim 9, comprising the following additional step:
providing both data and energy to each of said data- and energy-carrying subunits in a single physical movement.

12. A system for data and energy transfer, comprising:
a control system, comprising a data and energy receiver;
a data- and energy-channeling device; and
a non-transitory transfer medium comprising data- and energy-carrying subunits,
wherein said data- and energy-carrying subunits are configured to hold multiple data and energy states, and
wherein said data and energy receiver is configured to provide both data and energy to each of said data- and energy-carrying subunits in a first physical movement, in a first direction, by at least part of said energy receiver or at least part of said subunits.

13. The system for data and energy transfer of claim 12, wherein said data- and energy-carrying subunits comprise domains.

14. The system for data and energy transfer of claim 12, wherein said domains comprise electrostatic domains.

15. The system for data and energy transfer of claim 12, wherein each information- and energy-carrying subunit of said non-transitory transfer medium comprises different possible data and energy states, and wherein said different possible data and energy states comprise at least a first state and at least a second state.

16. The system for data and energy transfer of claim 15, wherein said different possible data and energy states comprise at least three different states, comprising said at least one first state and said at least one second state.

17. The system for data and energy transfer of claim 15, wherein said different possible data and energy states comprise at least four different states, comprising said at least one first state and said at least one second state.

18. The system for data and energy transfer of claim 12, wherein said control system comprises an amplifier, configured to boost a modulated carrier wave from a first energy level to a second energy level, facilitating energy harvesting by a receiver.

19. The system for data and energy transfer of claim 12, wherein said data and energy receiver is configured to receive both data and energy from each of said data- and energy-carrying subunits in a single physical movement, in one direction, by at least part of said energy receiver or at least part of said subunits.

20. The system for data and energy transfer of claim 12, wherein said data and energy receiver is configured to receive both data and energy from at least one of said data- and energy-carrying subunits in a second physical movement, in addition to said first physical movement, by at least part of said energy receiver or at least part of said subunits.

* * * * *